United States Patent [19]
Schilling et al.

[11] Patent Number: 5,889,070
[45] Date of Patent: Mar. 30, 1999

[54] PROCESS FOR PREPARING POLYAMINES AND POLYSOCYANATES

[75] Inventors: Steven L. Schilling, Glen Dale, W. Va.; Clarence D. Blue, Dormagen, Germany; Ricky L. Adkins, New Martinsville, W. Va.

[73] Assignee: Bayer Corporation, Pittsburgh, Pa.

[21] Appl. No.: 152,445

[22] Filed: Sep. 14, 1998

Related U.S. Application Data

[63] Continuation of Ser. No. 994,576, Dec. 22, 1992, abandoned, which is a continuation-in-part of Ser. No. 865,400, Dec. 10, 1991, abandoned.

[51] Int. Cl.⁶ ..................................... C08G 18/76
[52] U.S. Cl. ................ 521/155; 560/352; 560/353; 564/334
[58] Field of Search ..................... 560/352, 353; 564/334; 521/155

[56] References Cited

U.S. PATENT DOCUMENTS

| | | | |
|---|---|---|---|
| 4,465,639 | 8/1984 | Hatfield, Jr. | 260/453 |
| 4,766,247 | 8/1988 | Ford et al. | 564/498 |
| 4,792,624 | 12/1988 | Hatfield, Jr. | 564/333 |

FOREIGN PATENT DOCUMENTS

| | | |
|---|---|---|
| 2038126 | 9/1991 | Canada . |
| 0446781 | 3/1991 | European Pat. Off. . |

*Primary Examiner*—Rachel Gorr
*Attorney, Agent, or Firm*—Joseph C. Gil; Lyndanne M. Whalen; Godfried R. Akorli

[57] ABSTRACT

Disclosed herein is an improved process for preparing a polyamine mixture derived by reacting aniline with formaldehyde in the presence of an acid catalyst the improvement comprising mildly reducing the polyamine mixture by a process step comprising catalytically or chemically hydrogenating the polyamine mixture in the presence of a metal catalyst.

5 Claims, No Drawings

PROCESS FOR PREPARING POLYAMINES AND POLYISOCYANATES

This is a Continuation of Ser. No. 07/994,576, filed Dec. 22, 1992, now abandoned, which is a continuation-in-part of application Ser. No. 07/805,400, filed Dec. 10, 1991, now abandoned.

BACKGROUND OF THE INVENTION

1. Field of the Invention

The present invention relates to a process for preparing polyamines containing polymeric polyphenyl polymethylene polyamine. More specifically, the present invention relates to polyamines that are useful in preparing lighter color polyisocyanates and foams.

2. Brief Description of the Prior Art

Discoloration of foams made with polymethylene polyphenyl polyisocyanates has, at least, in part been attributed to impurities in the polyisocyanates. Hence, attempts at solving the color problem has entailed treating the polyisocyanates or their precursors so as to remove the impurities therefrom or reduce their adverse effects on color.

U.S. Pat. No. 4,792,624 discloses that polymethylene polyphenyl polyisocyanates of improved color can be obtained from certain polyamines which are prepared by the following process. The process comprises the preparation of the corresponding polymethylene polyphenyl polyamine by condensing aniline and formaldehyde in the presence of an acid catalyst which is characterized by adding a minor proportion of a polyamine mixture comprising di(aminophenyl)methanes and oligomeric polymethylene polyphenyl polyamines, (collectively known as polymeric MDA or simply MDA) to an intermediate stage of the condensation reaction where the various intermediately formed aminobenzylamines are present.

U.S. Pat. No. 4,465,639 discloses addition of controlled amounts of water to the reaction mixture produced by phosgenation of a mixture of polymethylene polyphenyl polyamines (and the like polyamines produced by condensation of formaldehyde and aromatic amines) prior to complete removal of excess phosgene gives rise to the corresponding polymethylene polyphenyl polyisocyanates having significantly improved properties such color of the polyisocyanates.

By the present invention, there is provided polyamines which are useful in the preparation of lighter color polyisocyanates.

SUMMARY OF THE INVENTION

In accordance with the foregoing, the present, invention encompasses an improved process for preparing a polyamine mixture derived by reacting aniline with formaldehyde in the presence of an acid catalyst the improvement comprising mildly reducing the polyamine mixture by a process step comprising partially hydrogenating the polyamine mixture in the presence of a metal catalyst to effect reduction in color.

It has been found that by subjecting a polyamine mixture containing methylene diphenyl diamine to a mild catalytic hydrogenation to phosgenation, one is able to obtain a polyisocyanate precursor that can be used in the preparation of the corresponding polyisocyanates and foams which are up to 90% lighter in color.

DETAILED DESCRIPTION OF THE INVENTION

As set forth hereinabove, the polyamine mixtures useful herein can be prepared by reacting aniline with formaldehyde, in the presence of an acid catalyst. The resultant polyamine is then neutralized with an excess of a base such as sodium hydroxide and washed to remove the acid salt which is formed. The polyamine is then purified by distillation to remove unreacted aniline and water. Generally, the method of preparing the polyamine mixture is known. The method of preparation, the reactants and acid catalyst can be as recited in U.S. Pat. No. 4,792,624 which is hereby incorporated by reference. Preferred is herein hydrochloric acid.

In accordance with the claimed invention, the step of mildly reducing the polyamine mixture comprises catalytically hydrogenating the polyamine mixture by treating the polyamine mixture by say, contacting it with up to 4000 psig of hydrogen pressure in the presence of a catalyst. The term "mildly reducing the polyamine mixture" is used herein to the denote partial hydrogenation, i.e., relatively low degree of hydrogenation of phenyl groups of the aromatic polyamines.

The catalysts employed herein can be fixed bed or slurry phase catalysts. The fixed bed catalysts useful herein can be pelletized, granular or spherical and can contain a variety of active metals which are known to catalyze hydrogenation reactions. These include but are not limited to the group VIIIA metals such as nickel, palladium, platinum, cobalt, ruthenium and rhodium. Corresponding slurry phase catalysts can also be used. They differ from the fixed bed catalyst primarily in particle size. In the fixed bed process the catalyst is immobile, and the polyamine solution flows through or around the catalyst bed. In the slurry process, the catalyst is suspended in the polyamine solution. Both the slurry phase and fixed bed hydrogenation can be carried out either batch-wise or continuously.

In the process of this invention, a solution of the polyamine in a hydrogenation solvent is added to the catalyst and the reactor pressurized with hydrogen. A variety of solvents can be used including alcohols, such as methanol, ethanol or t-butanol, and amines such as aniline. Efficient mixing is needed to ensure good contact between the catalyst, the polyamine, and the hydrogen gas. The temperatures used can be between 0° to 200° C. and the pressures used can range from atmospheric or less to over 4000 psi. Reaction time can range up to 6 hours or more, as needed to give reduction of the polymethylene polyphenyl polyisocyanate color. The combination of reaction conditions including type of catalyst, temperature, pressure and reaction time should be selected so that the desired color reduction is achieved, without extremely reducing the phenyl rings of the aromatic polyamine.

In accordance with the invention, the polyamine mixture is stripped of substantially any solvent before it is reacted with phosgene. This can be done by distillation.

The resultant polyamine can be reacted with a phosgene to produce polyisocyanates. The reaction of phosgene with a polyamine mixture of the claimed invention, corresponding to the desired polyisocyanates is conducted in the presence of an inert solvent such as chlorobenzene. The polyamines are reacted with phosgene in molar ratios of 1.5 to 20 moles and preferably about 2.2 to 4.0 moles of phosgene per amine group. Upon completion of the phosgenation, the excess phosgene and hydrogen chloride formed are separately or simultaneously removed. The phosgenation product which is present after the removal is in the form of a solution and may be separated (e.g., by simple distillation) into a gaseous phase containing volatile compounds having isocyanate groups and a liquid phase which is substantially crude polyisocyanate. The liquid phase can be worked up to produce polyisocyanates in a purer state.

In the preparation of foams, the polyisocyanates of the claimed invention are reacted with isocyanate reactive compounds such as polyols in the presence of foaming agents. This and other aspects of the claimed invention are further illustrated by the following non-limiting examples.

EXAMPLES

A. Hydrogenation of polymethylene polyphenyl polyamines

All of the hydrogenations were performed in a one liter stainless steel autoclave. Polyamine samples were obtained from commercial runs of aniline/formaldehyde reactions, followed by neutralization with caustic soda, purification and separation of the polyamine. The polyamine was liquified using methyl alcohol as a solvent to simplify its handling.

1) Slurry Phase Catalysis

Slurry phase catalytic hydrogenations of MDA were performed under a variety of different conditions. First, a methanol solution of MDA was added to the autoclave, followed by the addition of 5–15 g of the catalyst. The autoclave was then sealed and after purging with nitrogen, pressurized with hydrogen to the desired pressure. The reaction mixture was then heated to the desired temperature and held there for the given period of time before cooling. The actual conditions for each experiment are given in Table 1.

2) Fixed Bed Catalysis

The experiments with fixed bed catalysts were run in a one liter Robinson reactor using 30 g of catalyst. The catalysts were supported inside a wire basket inside the reactor. Once the basket was filled, it was placed in the autoclave and the autoclave was sealed. Next a solution of 480 g of (MDA) in 160 g methanol was added to the autoclave. After flushing with nitrogen, the autoclave was pressurized with hydrogen. The reaction mixture was then heated to 100° C. and held there for six hours.

B. Solvent Removal

Before phosgenating the MDA, the solvent was removed. This was done by distilling at atmospheric pressure to a temperature of 100° C., followed by a vacuum distillation (<1 mm Hg) to a temperature of 150° C. The MDA was then cooled to about 100° C. and weighed into eight ounce jars.

C. MDA Phosgenation and PMDI Color Determination 2000 g of chlorobenzene was added to a 3 neck 5 liter flask and cooled to 5° C. with an ice bath. Next, 600 g of phosgene was added at a rate of 300 g/hr. The MDA solution, consisting of 150 g of MDA in 1000 g monochlorobenzene (MCB), was then added over 10 minutes under a nitrogen purge. Phosgene addition was then resumed at a rate of 50 g/hr and the mixture was heated. The solution was allowed to reflux at about 130° C. for 1 hour with a continuous addition of phosgene. The phosgene addition was then stopped and the solution was degassed for 15 minutes. Most of the solvent was stripped off at atmospheric pressure and the material was cooled to room temperature. The material was then transferred to a 1 liter flask where the remaining solvent was removed under vacuum, while taking the pot temperature to 140° C. at about 1 mm Hg. The vacuum was the broken and the temperature was quickly raised to 230° C. before cooling under a nitrogen purge. Color determinations were performed by measuring the absorbance at 430 and 520 nm of a 10% solution of the polyisocyanate in chlorobenzene.

TABLE 1

Conditions for MDA Reduction Experiments

| Ex. # | Catalyst Metal | Metal (Conc.) | Support Material | Type | Weight (gm) | Reaction Temp. (°C.) | Reaction Time, (hr.) |
|---|---|---|---|---|---|---|---|
| 1 | Platinum | 5% | Carbon | Powder | 5.0 | 100 | 6 |
| 2 | Ruthenium | 5% | Alumina | Powder | 5.0 | 100 | 6 |
| 3 | Nickel | 93% | Raney | Powder | 15.0 | 150 | 6 |
| 4 | Nickel | 93% | Raney | Powder | 10.0 | 100 | 2.5 |
| 5 | Platinum | 5% | Carbon | Powder | 5.0 | 100 | 0 |
| 6 | Nickel | 93% | Raney | Powder | 15.0 | 100 | 0 |
| 1 | Palladium | 5% | Carbon | Powder | 5.0 | 100 | 6 |
| 8 | Ruthenium | 0.5% | Alumina | Pellets | 30.0 | 100 | 6 |
| 9 | Rhodium | 0.5% | Alumina | Pellets | 30.0 | 100 | 6 |
| 10 | Cobalt | 50% | Raney | Granular | 30.0 | 100 | 6 |
| 11 | Nickel | 50% | Raney | Granular | 30.0 | 100 | 6 |
| 12 | Palladium | 0.5% | Alumina | Pellets | 30.0 | 100 | 6 |
| 13 | Platinum | 0.5% | Alumina | Pellets | 30.0 | 100 | 6 |

TABLE 2

Phosgenation Color Results for Hydrogenated Reduced Slurry Phase Hydrogenation Catalysts

| Ex. # | Value Measured | Sample | Standard MDA | Improvement |
|---|---|---|---|---|
| 1 | 430 nm | 0.073 | 0.641 | 88.6% |
|   | 520 nm | 0.018 | 0.194 | 90.7% |
| 2 | 430 nm | 0.185 | 0.641 | 71.1% |
|   | 520 nm | 0.038 | 0.194 | 80.4% |
| 3 | 430 nm | 0.072 | 0.641 | 88.8% |
|   | 520 nm | 0.018 | 0.194 | 90.7% |
| 4 | 430 nm | 0.072 | 0.471 | 84.7% |
|   | 520 nm | 0.018 | 0.160 | 88.7% |
| 5 | 430 nm | 0.057 | 0.471 | 87.9% |
|   | 520 nm | 0.012 | 0.160 | 92.7% |
| 6 | 430 nm | 0.261 | 0.471 | 44.6% |
|   | 520 nm | 0.093 | 0.160 | 41.1% |
| 7 | 430 nm | 0.040 | 0.471 | 91.5% |
|   | 520 nm | 0.008 | 0.160 | 95.1% |

Color Results for Phosgenated Standard MDA and
MDA Hydrogenated With Fixed Bed Catalysts
Standard MDA Phosgenation Results

TABLE 3

| Ex. # | Brown | Gray |
|---|---|---|
| 1a | 0.601 | 0.222 |
| 1b | 0.711 | 0.278 |
| 1c | 0.534 | 0.203 |
| Average | 0.615 | 0.234 |
| Standard Deviation | 0.073 | 0.032 |

TABLE 4

| Ex. # | Value Measured | Sample | Improvement |
|---|---|---|---|
| 8 | 430 nm | 0.556 | 9.64% |
|  | 520 nm | 0.169 | 21.88% |
| 9 | 430 nm | 0.494 | 19.72% |
|  | 520 nm | 0.171 | 21.03% |
| 10 | 430 nm | 0.256 | 58.40% |
|  | 520 nm | 0.083 | 64.58% |
| 11 | 430 nm | 0.441 | 28.33% |
|  | 520 nm | 0.168 | 28.31% |
| 12 | 430 nm | 0.323 | 47.51% |
|  | 520 nm | 0.086 | 63.30% |
| 13 | 430 nm | 0.218 | 64.57% |
|  | 520 nm | 0.063 | 73.12% |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In an improved process for preparing a polyamine mixture derived by reacting aniline with formaldehyde in the presence of an acid catalyst the improvement comprising mildly reducing the polyamine mixture by a process step comprising partially hydrogenating the polyamine mixture in the presence of a metal catalyst for hydrogenation to effect color reduction of a corresponding polyisocyanate.

2. The process of claim 1 wherein the step of hydrogenating the polyamine mixture comprises reacting the polyamine mixture with hydrogen at about 100 to 4000 psig.

3. In an improved process for preparing a lighter color polyisocyanate comprising reacting phosgene with a polyamine mixture, the improvement wherein the polyamine mixture is as recited in claim 1.

4. A process for preparing a foam comprising reacting the polyisocyanate obtained A the process of claim 4 with an active hydrogen containing material in the presence of a blowing agent.

5. A lighter color foam which is prepared by the process of claim 4.

* * * * *